Dec. 18, 1951
E. J. HABOUSH
2,579,186
APPARATUS FOR POSITIONING BONE NAILS
FOR FIXING FRACTURED BONES
Filed Aug. 25, 1949
2 SHEETS—SHEET 1
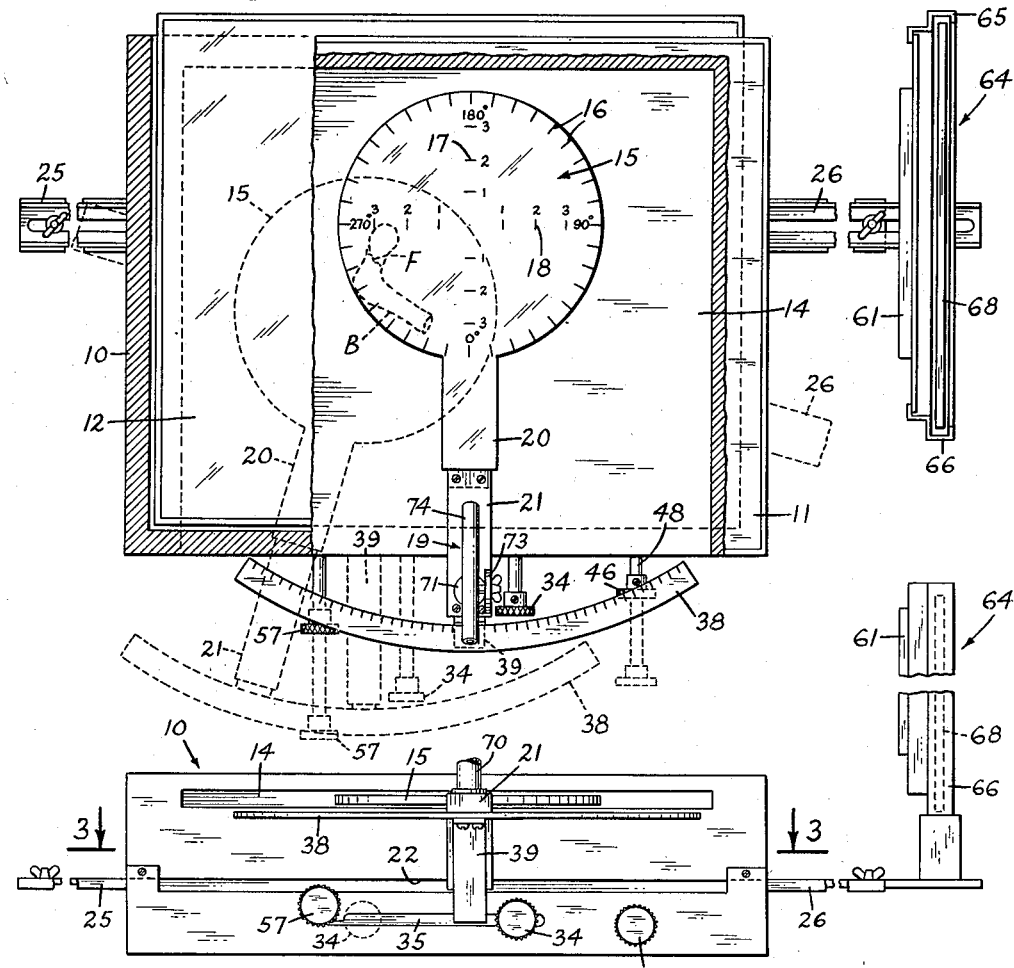
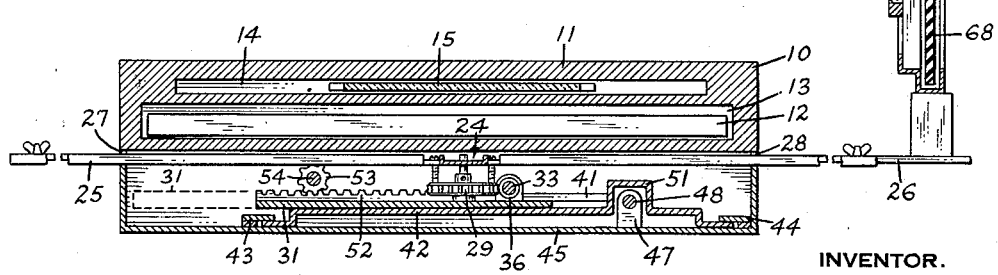
INVENTOR.
EDWARD J. HABOUSH
BY
Campbell, Brumbaugh, Free & Graves
HIS ATTORNEYS.

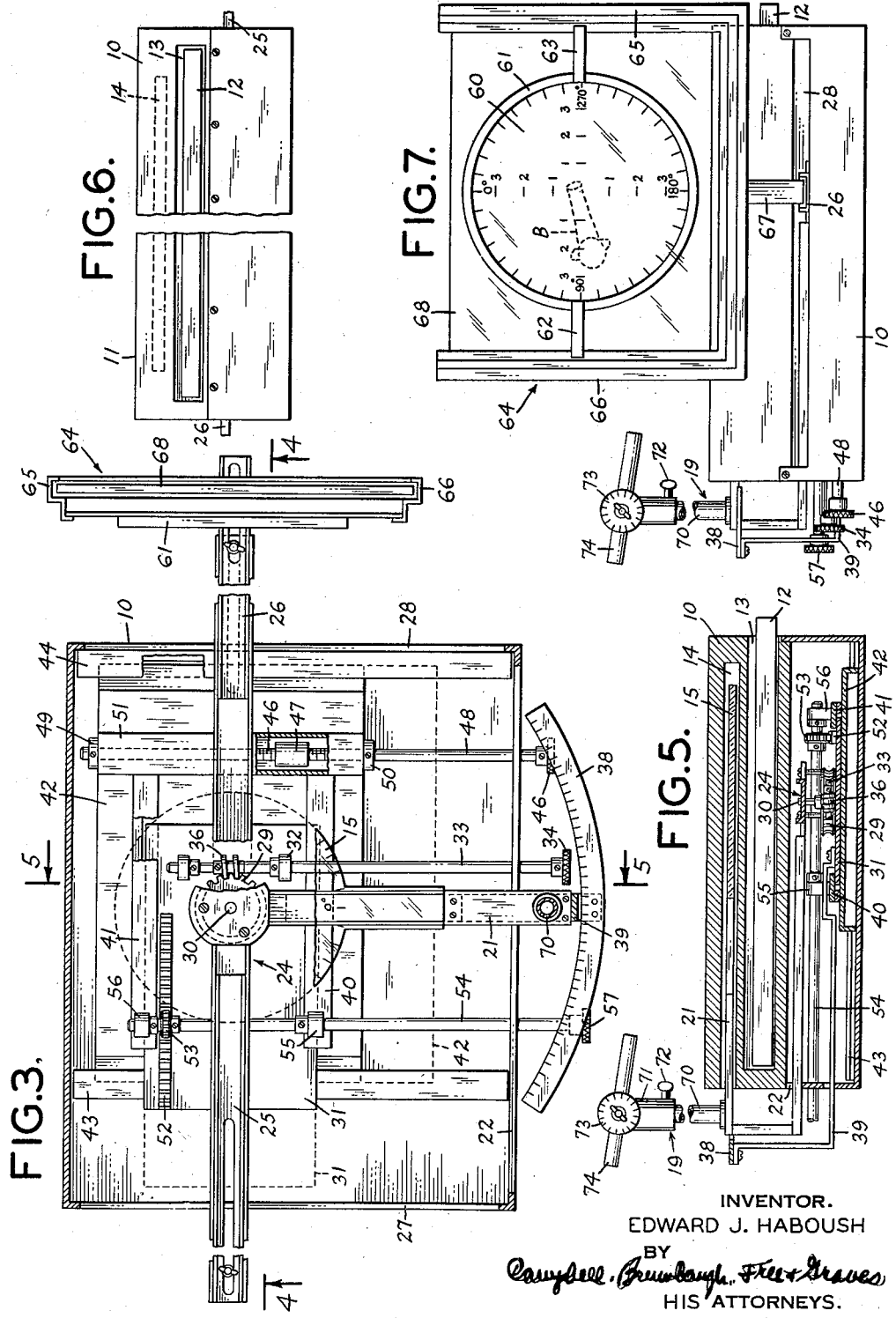

Patented Dec. 18, 1951

2,579,186

UNITED STATES PATENT OFFICE 2,579,186

APPARATUS FOR POSITIONING BONE NAILS FOR FIXING FRACTURED BONES

Edward J. Haboush, Brooklyn, N. Y.

Application August 25, 1949, Serial No. 112,366

6 Claims. (Cl. 128—92)

1

This invention relates to surgical apparatus for reducing and fixing fractures, especially fractures of the hip. More particularly, the invention relates to apparatus for determining the proper angles for insertion of a bone nail into the fractured bone, and for aligning the nail with the fractured bone so that the nail can be driven into the bone to hold the fragments together.

It has become fairly common, in cases of fracture of the hip, to fix the ball of the femur to the neck of the femur by means of one or more nails which are driven through the fragments to provide sufficient strength across the fracture to allow use of the leg while the fracture is healing.

One of the major problems in such an operation is to align the nail with the bone so that the nail will be centered and will extend on opposite sides of the fracture a sufficient distance to be firmly anchored in the bone fragments. Usually, alignment of the bone fragments and the nail is accomplished by repeated X-ray examination from two angularly related positions. However, even with constant observation, the distortion inherent in X-ray examinations makes the alignment and insertion of the nail a difficult and time-consuming operation.

The present invention comprises an apparatus by means of which it is possible to locate with great accuracy the center line of the bone fragments on opposite sides of a fracture. On the basis of the determined location, the apparatus can be adjusted to position a bone nail exactly in alignment with the axis of the fractured bone so that the nail can be driven lengthwise of the bone to span the fracture and thereby hold the fragments in exact alignment.

In general, the apparatus includes a support for the patient, for example, an operating table, having the apparatus of the present invention mounted therein so that the patient can be positioned with the fractured member over the apparatus. The apparatus includes a compartment for receiving an X-ray plate or film so that an X-ray photograph of the fractured member can be made. Between the X-ray plate and the member is mounted a scale member which is provided with suitable scale in the form of a protractor. It also includes linear measuring scales arranged diametrically of the protractor. The scale member is formed of suitable material transparent to the X-rays but its markings are made of material opaque to X-rays so that the scale also can be photographed on the plate in

2 its relation to the fractured bone. In this way, the inclination of the bone and its position with respect to the scale can be determined.

The scale member is mounted for angular and for lineal adjustment in its plane, and mechanism is provided for so adjusting the scale. In this way, by suitably adjusting the scale element, the center line of one of its linear scales can be lined up with the axis of the bone.

A similar second scale member is mounted on an arm which moves with the first scale member. These scales are perpendicular to each other so that a second X-ray can be taken at a right angle to the first photograph to show the inclination of the bone in a perpendicular plane.

Also movable with the first scale member is a nail guide which can be aligned with the axis of the bone by reference to the photographs so that a nail therein can be driven directly down the axis of the bone.

For a better understanding of the present invention, reference may be had to the accompanying drawings, in which:

Fig. 1 is a plan view of an apparatus embodying the present invention with a portion of the upper surface thereof broken away to disclose details of one of the scale members;

Fig. 2 is a view in elevation of the front of the apparatus;

Fig. 3 is a view in section taken on line 3—3 of Fig. 2;

Fig. 4 is a view in section taken on line 4—4 of Fig. 3;

Fig. 5 is a view in section taken on line 5—5 of Fig. 3;

Fig. 6 is a view in elevation of the back of the apparatus; and

Fig. 7 is a view in side elevation of the apparatus.

The form of apparatus chosen for purposes of illustration includes a box-like supporting member or casing 10 which can form a section of an operating table or the like, not shown. The casing 10 has an upper supporting surface 11 upon which the patient rests during X-ray examination and fixation of a fracture, for example, of the hip, by insertion of a bone nail through the fragments. The upper surface or supporting portion 11 of the casing is made of X-ray pervious material for photographing the bone on an X-ray plate or film which is mounted in a plate or film holder 12 removably mounted in a compartment 13 in the casing 10.

Between the supporting surface 11 and the compartment 12 is a second compartment 14 for receiving a scale member 15 which is used to locate the position of the fractured bone and to afford a means for aligning the bone nail with the bone fragments.

As best shown in Fig. 1, the scale member 15 may be disc-like in shape, although its shape is unimportant. The scale member 15 is formed of suitable transparent material such as transparent plastic, glass or the like, or any other material transparent to X-rays. The scale member 15 has suitable markings 16 around its edge forming a circular protractor or scale which is divided into degrees or into any other desired subdivisions for indicating angular displacement. The scale member 15 further is provided with diametrically arranged scales 17 and 18 in right angular relation, these scales being subdivided into units or linear measurement. The scale markings themselves are formed of material substantially opaque to X-rays so that exposure of the photographic material 12 through the fractured member and the scale will produce a composite picture of the bone B and the scale somewhat as shown in Fig. 1. Inasmuch as the bone B with the fracture F therein is shown with relation to the scale member 15, by suitable movement of the scale, it is possible to align one of the diametrical scales, for example, scale 17, with the bone and also adjust the common center of the scales with the center of the fracture F. This is accomplished by drawing a line or placing a ruler on the photograph parallel with the axis of the neck of the femur, for example, and extending through the center of the image of the scale member 15. This line intersects the scale markings 16 and indicates the angle through which the scale member 15 must be rotated to make the diametrical scale 17 parallel with the axis of the neck. Also, by measuring the distances on the scales 17 and 18 between the center of the scale member 15 and the point on the bone B at which the nail is to enter the bone, the scale member 15 can be shifted angularly and displaced for example, to the left and downwardly as viewed in Fig. 1, to bring the center of the scale member 15 to the point at which the nail is to enter, and thereby align the scale 17 with the axis of the neck of the femur.

The adjustment of the scale is utilizied to align a nail guide 19 (Fig. 5) with the bone fragments for inserting the nail at the proper angle. The mechanism for adjusting the scale includes an arm 20 projecting from the scale member 15 in alignment with the scale 17. The arm 20 is connected to the upper arm of a U-shaped bracket 21 which extends outwardly from the open end of the compartment 14, then downwardly and inwardly through a slot 22 in the end of the casing 10. The inner end of the U-shaped member 21, as shown in Fig. 3, is connected to one leg 23 of a T-shaped member 24 having other arms 25 and 26 projecting through slots 27 and 28 at opposite sides of the casing 10. The T-shaped member 24 is provided with a worm gear member 29 secured thereto and supported by means of a shaft 30 on a guide and supporting plate 31. The guide and supporting plate 31 also carries a bearing 32 for a shaft 33 having a knob 34 on its outer end. The shaft extends outside of the casing 10 through an elongated slot 35, as shown in Fig. 2. The shaft 33 carries on its inner end a worm 36 meshing with the gear 29 so that upon rotation of the knob 34, the T-shaped member 24 can be rotated around the shaft 30.

In order to afford an indication of the angular movement of the arm 20, an arcuate scale 38 adjacent the outer end of the bracket 21 is supported on an arm 39 which is secured at its inner end to the guide plate 31 for movement therewith, as shown in Fig. 5.

The guide plate 31 is supported for transverse movement by the guide elements 40 and 41 carried by a second lower guide plate 42. The lower guide plate 42 is mounted for sliding movement between L-shaped flanges 43 and 44 on the bottom 45 of the casing, as shown in Fig. 4.

The lower guide plate 42 is movable forwardly and rearwardly in the casing 10 by means of a handwheel 46 mounted on a shaft having an inner threaded end 46 engaging in a threaded bushing 47 fixed to the bottom 45 of the casing. The shaft 48 has collars 49 and 50 thereon engaging the opposite ends of a tunnel 51 forming a part of the plate 42 so that the plate can be moved bodily by rotation of the shaft 48.

The supporting and guide plate 31 is movable sideways in the casing 10 by means of a rack 52 thereon which is engaged by a pinion 53 mounted on a shaft 54. The shaft 54 is mounted in bearing blocks 55 and 56 supported on the guide members 40 and 41, respectively, so that when the shaft 54 is rotated by the handwheel 57, the guide plate 31 and the T-shaped member 24 are moved sideways in the casing carrying also the scale member 15 and the scale 38. Also, upon rotation of the handwheel 46, the plates 42 and 31, the T-shaped member 24, the scale member 15 and the scale 38 are moved toward the front or rear of the casing.

By means of the above-mentioned adjustments, it is possible to adjust the position of the scale 15 so that its center is at about the center of the fracture F and the center line of the scale 17 is in axial alignment with the two bone fragments, as shown in dotted lines in Fig. 1. These adjustments are made by referring to the image of the scale on the X-ray plate to determine the angular deflection, the fore and aft and sideways displacements of the scale 15 to bring the scale into alignment, as shown in Fig. 1.

In this way, the nail guide 19 can be brought into alignment with the center of the bone in one plane. However, it will not necessarily be aligned in a vertical plane. To attain vertical alignment, a second X-ray photograph must be made with a scale superimposed upon it to show the position of the bone fragment in a vertical plane.

Referring now to Figs. 3 and 7, the second scale may consist of a scale member 60 like that described above mounted in an annular rim member 61 formed of metal or the like and having supporting arms 62 and 63 suspending it from a U-shaped frame 64 having channel-like edge portions 65 and 66 for receiving a plate or film holder for photographic material sensitive to X-rays. The holder 64 and the scale 60 are supported on one arm 25 or 26 of the T-shaped member 24 by means of a suitable bracket 67 and thereby follow the movements of the T-shaped member.

By photographing the fractured member and the scale 60 on the plate 68 by means of X-rays, the angular position of the bone fragment with relation to the scale is shown, as for example, in dotted lines in Fig. 7. Inasmuch as the axis of the scale member 60 intersects the center line or axis of the scale member 15, the angle of the bone fragment B can be accurately determined and the nail guide 19 adjusted into alignment with the axis of the femur neck.

The nail guide 19 may consist simply of a standard 70 mounted on the U-shaped member 21 and having a collar 71 adjustable axially of the standard and fixed in position by means of a thumb screw 72. The collar is provided with a pivotally mounted scale disc 73 having a tubular member 74 movable therewith for receiving the bone nail. The graduated or scale disc 73 can be adjusted about its pivot to incline the tube 74 in a vertical plane at an angle corresponding to the angle of the bone fragments shown in the composite photograph of the bone and the scale 60.

It will be apparent from the preceding description of a typical apparatus embodying the invention that it is possible to align the nail accurately with the bone. Such accurate alignment also makes possible the control of the depth to which the nail is driven. As indicated before, distortion is inherent in X-ray examination so that X-ray photographs cannot accurately indicate the length of the bone or the distance the nail is driven into the bone. However, with the new apparatus, a guide and measuring wire or pin may be driven into the bone to an approximately accurate depth and this pin is then used to guide the fracture nail. By providing the pin with measuring marks, for example, with equally spaced notches or grooves of predetermined spacing, X-ray photographs of the relation of the nail to the pin will give accurate information of the actual depth to which the nail has been and must be driven for best results.

It will be understood that the adjusting mechanism for the scales and the bone guide 19 can be varied and any other equivalents can be used for this purpose. Also, the apparatus may be built into and form a part of an operating table or the like or may be separately constructed and inserted into and removed from the operating table, if desired. Therefore, the form of the invention described herein should be considered as illustrative and not as limiting the scope of the following claims.

I claim:

1. An apparatus for locating the axis of a fractured bone comprising a support having a surface to receive a member having a fractured bone, a first compartment in said support for receiving photographic material sensitive to X-rays, a measuring element transparent to X-rays having a scale thereon opaque to X-rays and graduated in degrees of angle and units of linear measurement, a second compartment for receiving said element between said first compartment and said surface, and mechanism in said support on the opposite side of said first compartment from said second compartment for rotating said measuring element and moving it in right angularly related directions.

2. An apparatus for locating the axis of a fractured bone comprising a support having a surface to receive a member having a fractured bone, a first compartment in said support for receiving photographic material sensitive to X-rays, a measuring element transparent to X-rays having a scale thereon opaque to X-rays and graduated in degrees of angle and units of linear measurement, a second compartment between said first compartment and said surface for receiving said measuring element, mechanism in said support on the opposite side of said first compartment from said second compartment for rotating said measuring element and moving it in right angularly related directions, and means movable with said measuring element for supporting a bone nail to align it with the fractured bone.

3. An apparatus for locating an axis of a fractured bone comprising a horizontal support for the fractured member, a measuring element below said support having a protractor scale thereon and a scale graduated in units of linear measure, said element being transparent to X-rays and said scales being substantially opaque to X-rays, a compartment below said measuring element for receiving photographic material sensitive to X-rays, and means below said compartment and connected to said measuring element for adjusting it angularly and linearly in right angularly related directions.

4. An apparatus for locating an axis of a fractured bone comprising a horizontal support for the fractured member, a measuring element below said support having a protractor scale thereon and a scale graduated in units of linear measure, said element being transparent to X-rays and said scales being substantially opaque to X-rays, a compartment below said measuring element for receiving photographic material sensitive to X-rays, means below said compartment and connected to said measuring element for adjusting it angularly and linearly in right angularly related directions, a pair of right angularly related arms movable with said measuring element, a guide device for supporting a bone nail mounted on one of said arms, a frame mounted on the other arm in vertical position, a second measuring element like the first-mentioned measuring element mounted on said frame, and a means behind said second measuring element for receiving photographic material sensitive to X-rays.

5. An apparatus for locating an axis of a fractured bone comprising a support for a member having a fractured bone, a compartment substantially parallel with said support for receiving photographic material sensitive to X-rays, a scale member transparent to X-rays movable between said support and said compartment, said scale member having a protractor scale thereon divided into units of angular measurement and right angularly related scales graduated in units of linear measurement, said scales being substantially opaque to X-rays for exposure onto said photographic material, and means out of the path of X-rays impinging on said photographic material and connected to said scale member for adjusting it angularly about the center of said protractor scale and linearly in right angularly related directions.

6. An apparatus for locating an axis of a fractured bone comprising a support for a member having a fractured bone, a compartment substantially parallel with said support for receiving photographic material sensitive to X-rays, a scale member transparent to X-rays movable between said support and said compartment, said scale member having a protractor scale thereon divided into units of angular measurements and right angularly related scales graduated in units of linear measurement, said scales being substantially opaque to X-rays for exposure onto said photographic material, means out of the path of X-rays impinging on said photographic material and connected to said scale member for adjusting it angularly about the center of said protractor scale and linearly in right angularly related directions, and a bone nail guide movable with said scale member in alignment with one of said right angularly related scales.

EDWARD J. HABOUSH.

REFERENCES CITED

The following references are of record in the file of this patent:

UNITED STATES PATENTS

| Number | Name | Date |
|---|---|---|
| 1,374,235 | Richards | Apr. 12, 1921 |
| 2,115,096 | Cleary | Apr. 26, 1938 |
| 2,120,729 | Chausse | June 14, 1938 |
| 2,226,708 | Cleary | Dec. 31, 1940 |